US006321711B1

(12) United States Patent
Kato

(10) Patent No.: US 6,321,711 B1
(45) Date of Patent: Nov. 27, 2001

(54) FUEL SUPPLY SYSTEM FOR A DIRECT INJECTED OUTBOARD ENGINE

(75) Inventor: Masahiko Kato, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/412,264

(22) Filed: Oct. 5, 1999

Related U.S. Application Data

(63) Continuation-in-part of application No. 09/131,172, filed on Aug. 7, 1998, now Pat. No. 6,112,505.

(30) Foreign Application Priority Data

Oct. 5, 1998 (JP) .......... 10-282451

(51) Int. Cl.[7] .......... F02M 33/04
(52) U.S. Cl. .......... 123/195 A; 123/509; 123/456
(58) Field of Search .......... 123/195 A, 193.3, 123/508, 509, 516, 456

(56) References Cited

U.S. PATENT DOCUMENTS 4,909,226 3/1990 Nakahama .
5,197,436 3/1993 Ozawa .
5,450,831 9/1995 Fukuoka .
5,603,303 * 2/1997 Okajima et al. .......... 123/508
5,855,197 1/1999 Kato .
5,890,472 * 4/1999 Saito .......... 123/509
5,915,363 6/1999 Iwata et al. .
5,941,205 8/1999 Hiraoka et al. .
5,943,996 8/1999 Sogawa et al. .
5,992,392 * 11/1999 Saito .......... 123/392
6,032,638 3/2000 Kato .
6,070,564 * 6/2000 Hiraoka et al. .......... 123/509
6,082,336 * 7/2000 Takahashi et al. .......... 123/508
6,112,726 * 9/2000 Saito et al. .......... 123/509
6,148,787 * 11/2000 Takano .......... 123/508
6,159,063 * 12/2000 Fujii et al. .......... 123/508

FOREIGN PATENT DOCUMENTS 11-117822 4/1999 (JP) .
11-173205 6/1999 (JP) .
11-270426 10/1999 (JP) .

* cited by examiner

*Primary Examiner*—Thomas N. Moulis
(74) *Attorney, Agent, or Firm*—Knobbe, Martens, Olson & Bear, LLP

(57) ABSTRACT

A fuel supply system is disclosed for a direct injected "V" type engine powering an outboard motor. The fuel supply system includes a pump for supplying fuel from a tank to a vapor separator. An electrical pump delivers fuel from the vapor separator to a mechanical high pressure pump, which delivers fuel under high pressure to a fuel manifold and further to a pair of fuel rails. The fuel rails supply fuel to fuel injectors for delivering fuel to the combustion chambers of the engine. Recesses are formed on a side of each cylinder head and one fuel rail is positioned within each recess. The mechanical high pressure pump is positioned vertically above the uppermost fuel injector so that any fuel vapor within the fuel rails will rise toward the fuel pump. Fuel vapor that accumulates within the high pressure fuel pump is returned to the vapor separator.

23 Claims, 7 Drawing Sheets

FUEL SUPPLY SYSTEM FOR A DIRECT INJECTED OUTBOARD ENGINE

PRIORITY INFORMATION

This application is a continuation-in-part of U.S. Application Ser. No. 09/131,172, which was filed on Aug. 7, 1998, now U.S. Pat. No. 6,112,505 and which claims priority to Japanese Application No. Hei 9-216839, which was filed on Aug. 11, 1997. This application also claims priority to Japanese Application No. Hei 10-282451, which was filed on Oct. 5, 1998.

BACKGROUND OF THE INVENTION

1. Field of the Invention

The present invention relates to an engine of the type utilized to power an outboard motor, and more particularly to a fuel supply system for an engine positioned within a cowling of an outboard motor and powering a water propulsion device of the motor.

2. Description of Related Art

Fuel vapors can be problematic in the fuel-supply system for internal combustion engines, especially those of the type in which the fuel is injected with a fuel injector. Fuel vapors are unpredictable and their concentration in the fuel supply system varies. The unpredictability of the vapors causes the fuel injector to deliver fuel in a ratio to the air which may be leaner or richer than desired, resulting in poor engine performance.

Further, the fuel supply system may be used with an engine positioned in a confined space, such as the cowling of an outboard motor. In these situations, space is limited, and the fuel supply system needs to be as small and simple in arrangement as possible.

In the past, fuel-vapor separators have been provided along the fuel supply path to separate at least part of the vapor from the liquid fuel. In manifold injection systems, an electrically-operated, high-pressure pump has been positioned within the vapor separator in order to save space and to permit the pump to be cooled.

In direct injection systems, fuel is injected directly into the combustion chamber. This type of fuel injection requires that the fuel be injected at a higher pressure than with manifold injection systems, in which the injection pressure is substantially at or even below atmospheric pressure. Electric pumps are not totally capable of supplying fuel at such high pressures. Instead, a mechanical pump that is driven by the engine has been used to generate the high pressures required by direct injection systems.

In order to make the fuel distribution system more compact, the mechanical high pressure pump can be located in the vicinity of the engine's cylinder head. Similarly, the fuel rails that deliver fuel from the high pressure pump to fuel injectors can be located close to the cylinder head. Since the cylinder head is heated by lubricating oil, it becomes very hot. As heat is transferred from the cylinder head to the fuel supply system, vapors may accumulate within the fuel rails.

SUMMARY OF THE INVENTION

A need therefore exists for a fuel supply system for a direct injected engine wherein the fuel pumps and delivery lines are arranged in a compact manner and wherein the fuel supply system prevents vapors from accumulating in fuel supply pipes that are located in the vicinity of the cylinder head.

Advantageously, the fuel supply system of the present invention is arranged to reduce the girth of the engine and to reduce the transmission of vapor to the charge former(s) of the engine. In this manner, the air/fuel ratio of the charge supplied to each combustion chamber of the engine is more accurately controlled and engine operation is improved.

In accordance with one aspect of the present invention, an engine is provided for powering an outboard motor. The engine is positioned in a cowling of the motor and is arranged to drive a water propulsion device of the motor. The engine comprises a plurality of combustion chambers arranged vertically relative to each other. Each combustion chamber communicates with a charge former. A fuel supply system includes a pump and a fuel rail. The fuel rail communicates with the charge formers and the pump has a discharge port that communicates with the fuel rail. The pump discharge port is positioned above the uppermost one of the charge formers so that any vapor forming in the fuel rail can travel upwardly to the pump.

In one form, the engine includes a pair of cylinder banks, each of which defines in part a plurality of combustion chambers arranged generally one above the other. The pump is arranged in this engine so as to be at a higher position on the engine than the uppermost one of the charge formers associated with at least one of the cylinder banks, and preferably higher than an uppermost one of all of the charge formers associated with both cylinder banks.

The fuel pump in one mode can be positioned on a top side of the engine and be driven by a crankshaft of the engine through a pulley system. In other modes, the fuel pump can be driven by a camshaft of the engine through a pulley system, through a direct axial connection, or through a cam of the camshaft.

Another aspect of the present invention involves an engine with a compact configuration that powers an outboard motor. The engine is positioned within a cowling of the motor and is arranged to drive a water propulsion device. The engine comprises a cylinder block and at least one cylinder head connected to the cylinder block. The cylinder head and the cylinder block cooperate with each other to define a cylinder bank containing at least one cylinder. Each cylinder accommodates a reciprocating piston. At least one combustion chamber is defined between the cylinder head, a wall of the cylinder, and the corresponding piston. A fuel system is provided and includes a fuel pump that communicates with a charge former through a fuel rail. The charge former communicates with the combustion chamber. The cylinder head has a recess formed along a side thereof, and the fuel rail is positioned within the recess.

In one mode, the engine has a V type configuration and further includes a second cylinder head attached to the cylinder block. The second cylinder head and the cylinder block cooperate with each other to define a second cylinder bank containing at least one cylinder. The second cylinder head, like the first cylinder head, includes a recess formed along a side thereof, and another fuel rail is received within the recess of the second cylinder head.

Further objects, features, and advantages of the present invention over the prior art will become apparent from the detailed description of the drawings which follows, when considered with the attached figures.

BRIEF DESCRIPTION OF THE DRAWINGS

These and other features, aspects and advantages of the present invention will now be described with reference to drawings of certain presently preferred embodiments, which embodiments are intended to illustrate and not to limit the present invention. The drawings contain the following figures.

DETAILED DESCRIPTION OF THE PREFERRED EMBODIMENTS OF THE INVENTION

Figure 1:
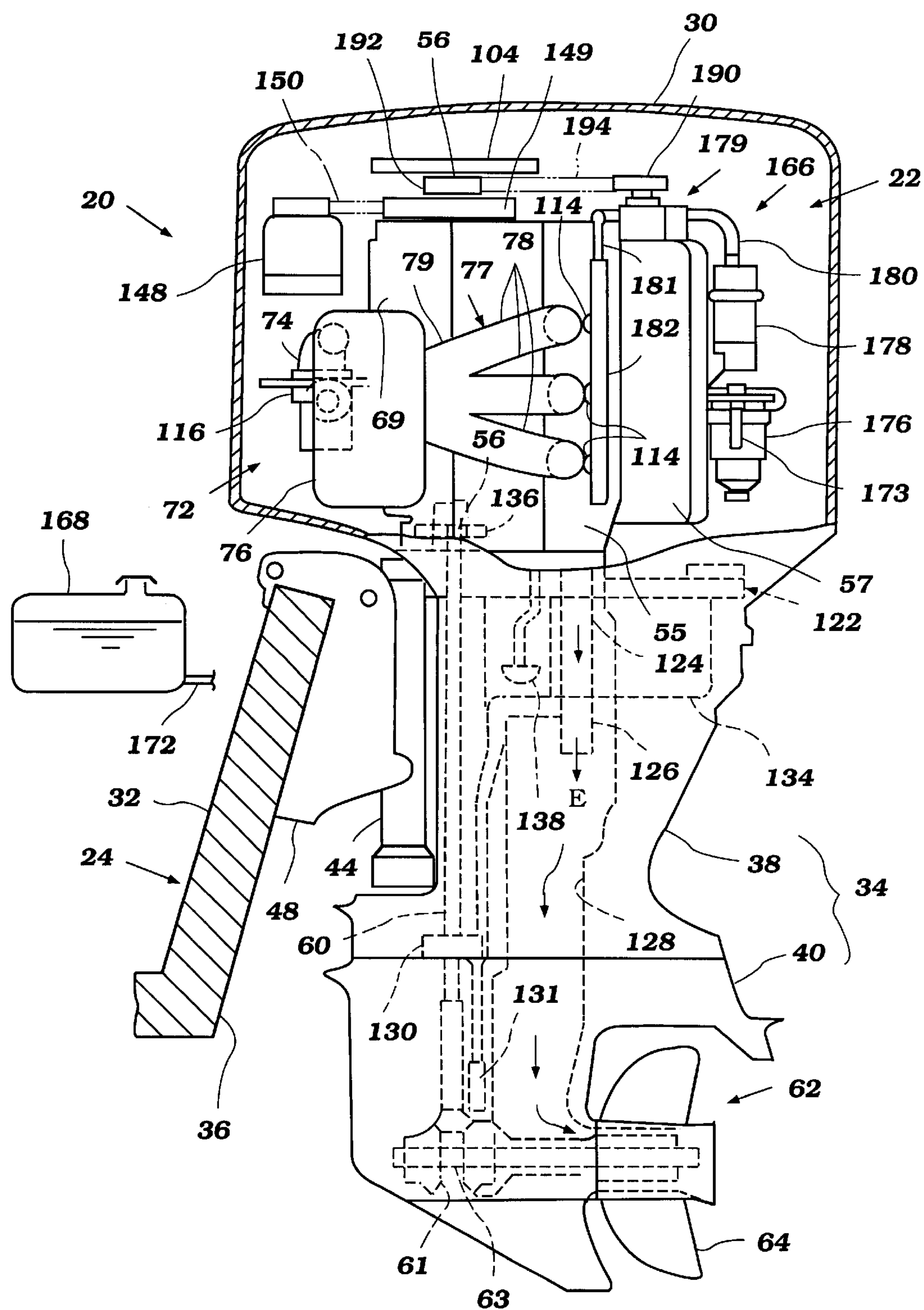
FIG. 1 is a partial sectional side view of an outboard motor powered by an engine and an associated fuel supply system, both of which are configured in accordance with a preferred embodiment of the present invention.

FIG. 1 illustrates an outboard motor 20 powered by an engine 22 and having a fuel supply system in accordance with the present invention. The fuel supply system is described for use with an engine powering an outboard motor 20 since this particular application is one in which the features of the fuel supply system described have particular benefits. It should be understood, however, that the engine 22 which is supplied fuel with the fuel supply system arranged as described may be used in other applications.

As illustrated in FIG. 1, the outboard motor 20 is of the type utilized to propel a watercraft 24. The outboard motor 20 has a power head comprised of a main cowling portion 30. The motor 20 includes a lower unit 34 extending downwardly from the cowling portion 30. The lower unit 34 comprises an upper or "driveshaft housing" section 38 and a lower section 40.

The motor 20 is connected to a steering shaft (not shown). The steering shaft is supported for steering movement about a vertically extending axis within a swivel or steering bracket 44. The swivel bracket 44 is connected by means of a pivot pin (not shown) to a clamping bracket 48 which is attached to a transom portion 32 of a hull 36 of a watercraft 24. The pivot pin permits the outboard motor 20 to be trimmed and tilted up about the horizontally disposed axis formed by the pivot pin.

Figure 2:
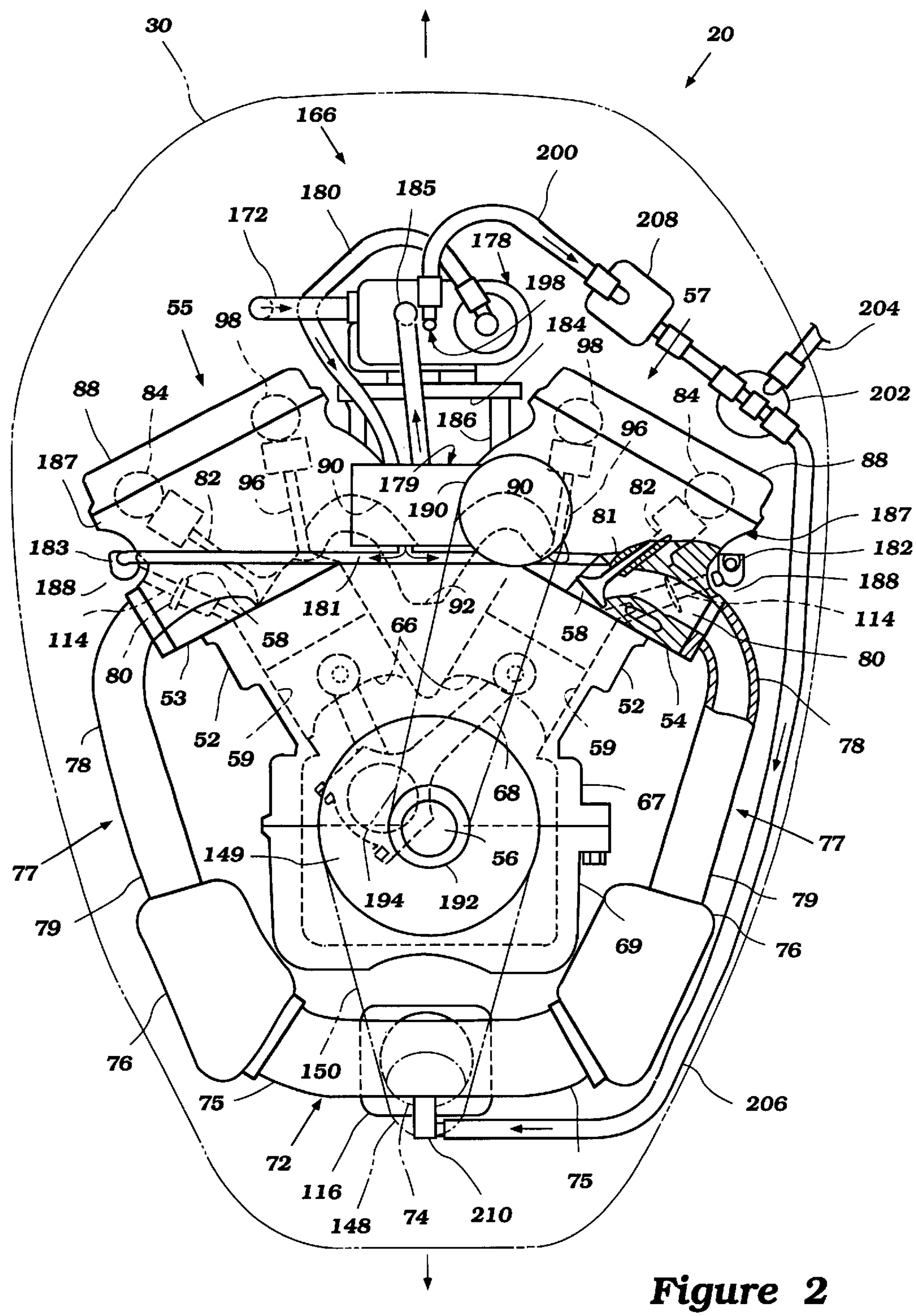
FIG. 2 is a top view of the motor illustrated in FIG. 1, with a cowling of the motor and several internal components of the engine illustrated in phantom.

With reference to FIGS. 1 and 2, the engine 22 is positioned within the cowling portion 30. The engine 22 is preferably of the six-cylinder, four-cycle variety, and is arranged in a "V" fashion. In this arrangement, the engine 22 has a cylinder block 52 with a first cylinder head 53 and a second cylinder head 54 connected thereto and cooperating therewith to define first and second cylinder banks 55, 57. The cylinder banks 55, 57 define a valley between them. This valley faces away from the watercraft to which the motor 20 is attached. Each bank preferably defines three cylinders 59, each having a combustion chamber 58 defined in the space between the cylinder 59, its corresponding cylinder head 53, 54, and a piston 66 movably positioned in the cylinder 59. As may be appreciated by those skilled in the art, the engine 22 may have a greater or lesser number of cylinders, such as two, four, or eight or more and be arranged in other than "V" fashion, such as in an in-line arrangement. In addition, while the cylinder block is shown as unitary component, it is understood that it can be formed by a plurality of elements and thus constitute an assembly (i.e., a cylinder block assembly). And the cylinder heads, in the illustrated embodiments, are actually assemblies formed by at least a head casting and a cover.

As illustrated in FIG. 2, each piston 66 is connected to a connecting rod 68 extending to a vertically extending crankshaft 56. With reference to FIG. 1, the crankshaft 56 is connected to a top end of a driveshaft 60 which extends downwardly through the lower unit 34, where it drives a bevel gear and a conventional forward-neutral-reverse transmission 61. A control (not shown) is preferably provided for allowing an operator to remotely control the transmission from the watercraft 24.

The transmission drives a propeller shaft 63 which is journaled within the lower section 40 of the lower unit 34 in a known manner. A hub 62 of a propeller 64 is coupled to the propeller shaft 63 for providing a propulsive force to the watercraft 24 in a manner well known in this art.

The crankshaft 56 is journaled for rotation with respect to the cylinder block 52. A crankcase cover 69 engages an end of the block 52 generally opposite the heads 53, 54, defining therein a crankcase chamber 67 within which the crankshaft rotates. The crankcase cover 69 may be attached to the cylinder block 52 by bolts or similar means for attaching known to those skilled in the art. The crankcase chamber 67 is positioned generally opposite the heads 53, 54 and on the side of the engine closest to the watercraft 24.

As illustrated in FIG. 1, a flywheel 104 is preferably maintained in position on the top end of the crankshaft 56.

Figure 4:
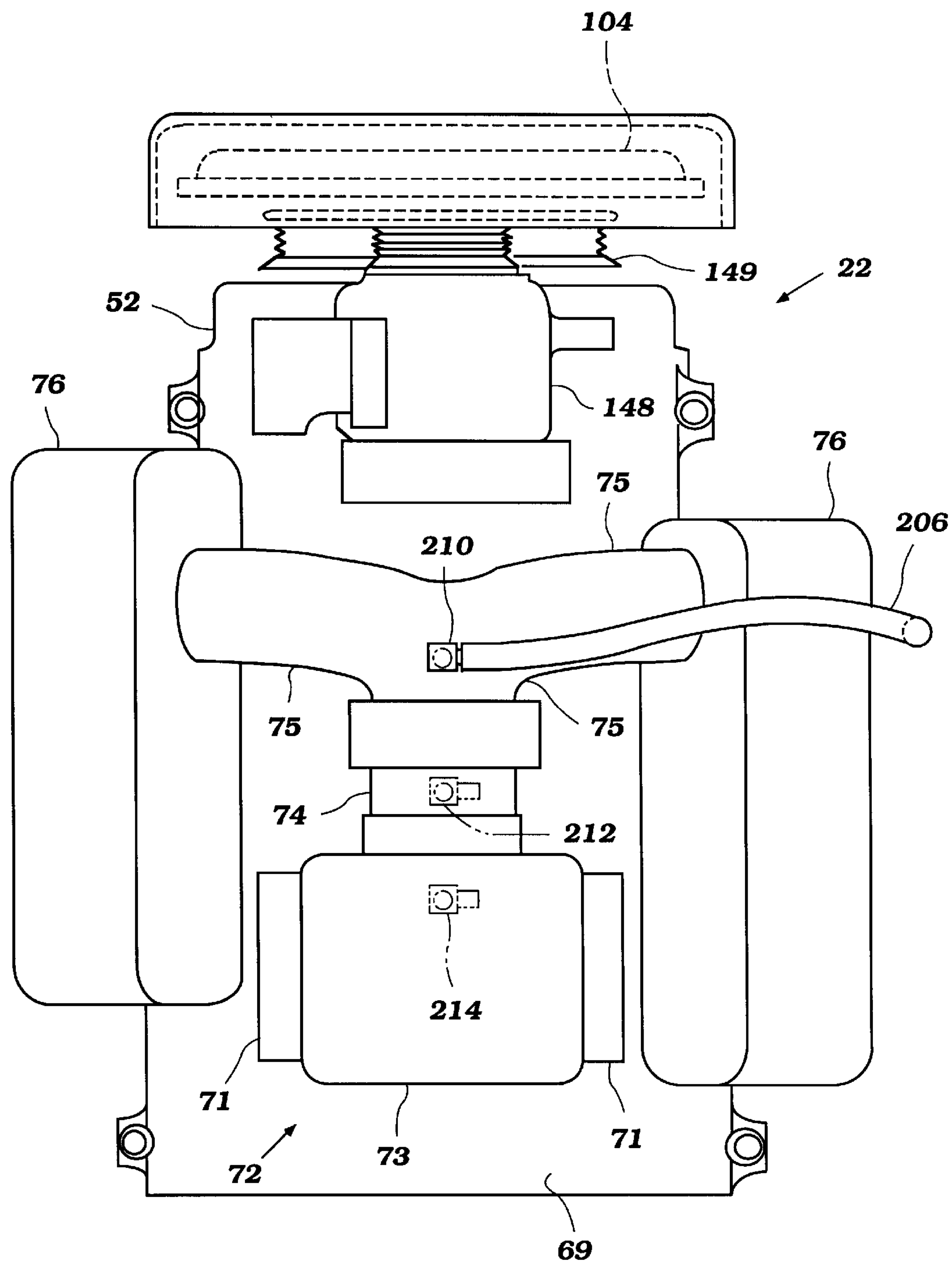
FIG. 4 is front end view of the engine illustrated in FIG. 2.

The engine 22 includes an air intake system 72 for providing air to each combustion chamber 58. The intake system 72 is preferably positioned at the crankcase or watercraft end of the engine 22. As best illustrated in FIGS. 1 and 4, air passes through the vent (not shown) in the motor cowling 30 into a pair of inlets 71 leading to a silencer 73. A main intake pipe 74 leads upwardly from the silencer 73.

As best illustrated in FIG. 1, a throttle 116 is provided for controlling the flow of air into the combustion chambers 58. The throttle 116 preferably comprises a moveable plate positioned within the intake pipe 74 and is preferably controlled through a cable by the operator of the watercraft.

Branch pipes or passages 75 lead from the main intake pipe 74 to first and second surge tanks 76. A manifold 77 extends from each surge tank 76. Each manifold 77 has a main part 79 connected to the surge tank 76 leading to individual branches 78 extending therefrom. Preferably, each manifold 77 has three branches 78, each branch 78 extending to a passage 80 in the cylinder head 53, 54 leading to one of the combustion chambers 58.

As shown in FIG. 2, means are provided for controlling the flow of air into each combustion chamber 58. This means preferably comprises at least one intake valve 82 corresponding to each intake passage 80. As illustrated, all of the intake valves 82 for each bank of cylinders are preferably actuated by a single intake camshaft 84. The intake camshaft 84 is mounted for rotation with respect to its respective cylinder head 53, 54 and is connected thereto with at least one bracket. Each intake camshaft 84 rotates within an enclosure defined by the cylinder head 53, 54 and a camshaft cover 88 connected thereto.

Each valve 82 preferably has a head which is adapted for seating against a valve seat in the passage 80, and a stem extending from the head through a valve guide 81 to a follower. A spring is positioned between the follower and a portion of the cylinder head 53, 54 for biasing the valve 82 upwardly into a position in which the valve 82 closes the passage 80.

An exhaust system is provided for routing the products of combustion within the combustion chambers 58 to a point external to the engine 22. In particular, an exhaust passage 90 leads from each combustion chamber to a main passage 92. The remainder of the exhaust system is described in more detail below.

FIG. 2 also shows means for controlling the flow of exhaust from each combustion chamber 58 to its respective exhaust passage 90. This means preferably comprises at least one exhaust valve 96. Like the intake valves 82, the exhaust valves 96 of each cylinder bank are preferably all actuated by a single exhaust camshaft 98. Each exhaust camshaft 98 is journaled for rotation with respect to its respective cylinder head 53, 54 and connected thereto with at least one bracket. Each exhaust camshaft 98 is enclosed within the camshaft cover 88.

As with the intake valve 82, each exhaust valve 96 preferably includes a head for selective positioning against a valve seat in the passage 90. A stem extends from the head of the valve 96 through a valve guide in the cylinder head 53, 54. A follower is positioned at the opposite end of the stem for engagement by the camshaft 98. A spring is positioned between the follower and the cylinder head 53, 54 for biasing the valve 96 into a position in which the valve closes the passage 90.

Although not illustrated, means are provided for driving the camshafts 84, 98. This means for driving may be of a variety of types known to those skilled in the art, such as a toothed gear mounted on the crankshaft, a similar gear mounted to each camshaft, and a timing chain extending in engagement with the gears whereby the crankshaft drives the camshafts.

The remainder of the exhaust system will now be described with reference to FIG. 1. As illustrated, an exhaust guide 122 is positioned at the bottom end of the engine 22. The exhaust guide 122 has a passage 124 extending therethrough which communicates with the common exhaust passage 92. The common exhaust passage 92 extends through the valley of the engine 22 and is defined by the cylinder block 52. As stated above, the individual exhaust passages 90 lead to the common exhaust passage 92.

An exhaust pipe 126 is connected to the bottom side of the exhaust guide 122 in alignment with the passage 124 therethrough. The exhaust pipe 126 terminates within a chamber of a muffler 128.

As also shown in FIG. 1, the muffler 128 is positioned within the lower unit 34 near the driveshaft 60. An exhaust gas outlet is provided in the bottom end of the muffler 128, through which the exhaust gas is routed (in the direction of arrows "E") through the hub 62 of the propeller 64 to a point external of the motor 20.

A suitable ignition system is provided for igniting an air and fuel mixture within each combustion chamber 58. Such systems are well known to those skilled in the art. The ignition system may include a spark plug for use in igniting the air and fuel mixture within each combustion chamber 58.

A cooling system is provided for cooling the engine 22. As shown in FIG. 1, cooling liquid, preferably water from the body of water in which the motor 22 is positioned, is pumped through a water inlet 131 by a water pump 130 positioned in the lower unit 34. The pump 130 is preferably driven by the driveshaft 60 and expels the cooling liquid upwardly through a cooling liquid supply pipe 132. The coolant flows through the supply pipe 132 from the pump 130 to one or more coolant jackets (not shown) for cooling the engine 22, such as the cylinder heads 53, 54, block 52, and exhaust system.

The cooling system may include a pressure valve (not shown) positioned along the coolant path for diverting coolant through a relief passage and thereon to the coolant drain system in the event the coolant pressure exceeds a predetermined high pressure. In addition, the cooling system may include a thermostat positioned along the coolant path for monitoring the temperature of the coolant. The thermostat is preferably arranged so that if the coolant temperature is high, the thermostat is opened to allow coolant to flow though the engine 22 at a high rate. On the other hand, if the temperature of the coolant is low, then the thermostat is closed, allowing the engine to warm up. The coolant is preferably returned through a discharge into the body of water.

The engine 22 preferably includes a lubricating system for providing lubricant to the various portions of the engine. With reference to FIG. 1, the lubricating system includes an oil reservoir 134 positioned below the engine 22. The reservoir 134 is in communication with an oil pump 136 via a suction tube 138. The oil pump is drivingly positioned on the end of the crankshaft 56 at the bottom of the engine 22. Seals are provided for sealing the oil pump with respect to the remainder of the engine 22. The oil pump 136 draws lubricant from the reservoir 134 and then delivers it through a connecting passage through galleries leading throughout the engine. The lubricant is then arranged to drain back to the reservoir 134 for reuse. A portion of the cooling system may be arranged to cool the lubricant in the reservoir.

As illustrated in FIG. 1, the engine 22 may include additional engine auxiliary features or accessories such as an alternator 148. Preferably, the alternator 148 is utilized to produce electricity for firing the spark plugs and similar functions. The alternator 148 is run by a belt 150 which is driven by a pulley 149 mounted on the end of the crankshaft 56 below the flywheel 104. As illustrated in FIG. 1, the alternator 148 is positioned near the top of the engine 22 on the crankcase end of the engine 22 opposite its valley. The engine 22 may also include a starter motor (not shown) for use in starting the engine.

Because of the position of the alternator 148, the air inlet is formed in a lower end of the intake pipe 74. Air passes upwardly through the pipe 74 and is delivered to the surge tanks 76.

Figure 3:
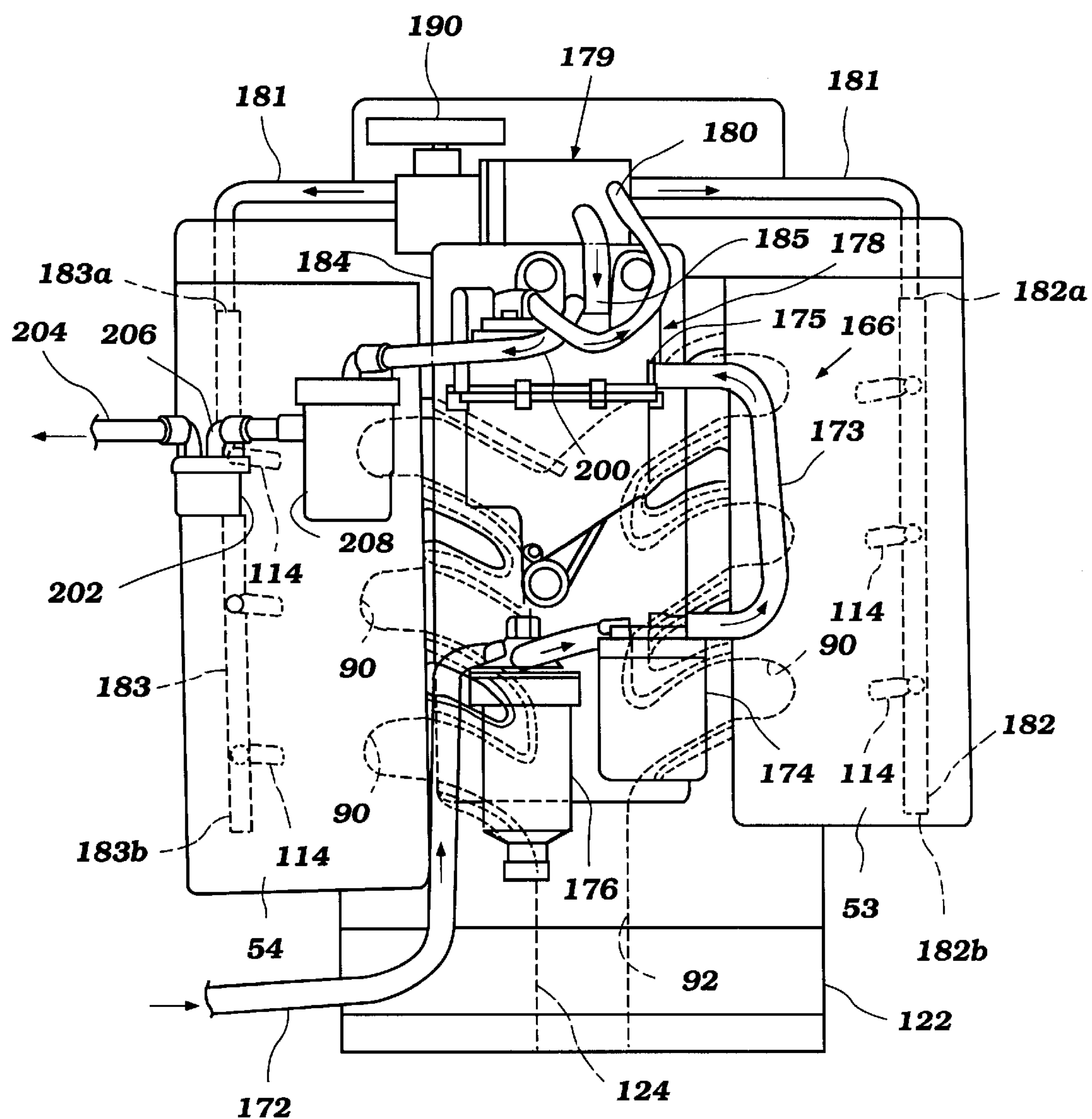
FIG. 3 is a rear end view of the engine illustrated in FIG. 2 showing the fuel supply system.

A fuel supply system 166 is provided for delivering fuel to each combustion chamber 58 for combustion therein. FIGS. 1–3 illustrate a fuel supply system in accordance with a first embodiment of the present invention. In this embodiment, fuel is pumped from a fuel source, such as a tank 168 on board the watercraft 24, through a supply line 172 by a low pressure pump 174. This pump 174 may be of the diaphragm type. Preferably, the pumped fuel is passed through a filter 176 positioned along the line 172.

The fuel is delivered by the pump 174 through a fuel line 173 to an inlet pipe 175 of a vapor separator 178. The vapor separator 178 is adapted to separate liquid fuel from vapor in any known manner. An electric pump (not shown) within the vapor separator supplies fuel through a fuel supply pipe 180 to a high pressure pump 179.

The high pressure pump 179 delivers fuel under high pressure to a fuel delivery manifold 181. The manifold 181 communicates with a pair of substantially vertical fuel rails 182, 183. Each fuel rail 182, 183 extends adjacent to one of the cylinder banks 55, 57 and supplies fuel under pressure to fuel injectors 114. As shown in FIG. 2, the fuel injectors 114 are preferably arranged to inject fuel directly into the combustion chambers 58. This direct injection arrangement requires that the fuel be supplied to the injectors at a relatively high pressure such as, for example, a pressure within the range of 50 to 150 kg/cm$^2$.

The high pressure fuel pump 179 is preferably a mechanically operated pump constructed after a manner known in the art. The pump 179 is preferably positioned at the top end of the engine 22 vertically above the uppermost fuel injector 114. The fuel delivery manifold 181 preferably extends substantially horizontally along the top of the engine before bending to deliver fuel to an upper end 182*a*, 183*a* of each fuel rail 182, 183. As such, the fuel pump 179 is positioned at the uppermost point of the fuel supply system 166. A lower end 182*b*, 183*b* of each fuel rail 182, 183 is closed.

As is typical in the art, the mechanical fuel pump is continuously driven by the engine 22, thus maintaining a high fuel pressure in the fuel rails 182, 183. The pump includes a pressure regulator (not shown). When the pressure within the pump 179 exceeds a desired limit, the regulator opens an access and some of the contents of the fuel pump 179 are dumped through a return line 185 to the vapor separator 178.

Each fuel rail 182, 183 is positioned adjacent the respective cylinder heads 53, 54 on an outer side 187 of the cylinder head 53, 54. With reference specifically to FIG. 2, each cylinder head 53, 54 has a recess 188 formed on its outer side 187 at a location immediately adjacent the point where the intake manifold branch 78 meets the cylinder head passage 80. The recesses 188 run substantially vertically along the outer side 187 of the cylinder heads 53, 54. A fuel rail 182, 183 is fit within each of these recesses 188.

Positioning the fuel rails 182, 183 within the recesses 188 contributes to the compactness of the engine. More room is thus available within the cowling for other components. The cylinder heads 53, 54, however, tend to become very hot during operation of the engine. Since the fuel rails 182, 183 are in such close proximity to the cylinder heads 53, 54, heat from the cylinder heads will tend to vaporize some of the fuel within the fuel rails. Fuel vapor within the rails 182, 183 is undesired because it may interfere with the consistency of fuel injected through the fuel injectors 114 into the combustion chambers 58, and thus may adversely affect engine running conditions.

Since the high pressure fuel pump 179 is positioned above the uppermost fuel injector 114, fuel vapor that may form within the fuel rails 182, 183 will naturally travel upwardly within the fuel rails to the pump 179. Fuel vapor that accumulates within the fuel pump 179 is dumped into the vapor separator 178 through the fuel return pipe 185. Because vapor from the fuel rails 182, 183 naturally migrates up to the high pressure fuel pump 179, vapor transmission to the fuel injectors 114 is reduced and the air/fuel ratio within the combustion chambers 58 may be accurately managed.

As illustrated in FIGS. 1 and 2, the high pressure mechanical fuel pump 179 is preferably powered by the crankshaft 56. The high pressure pump 179 has a driveshaft (not shown) connected to a pump pulley 190. A drive pulley 192 is positioned on the crankshaft 56 just below the flywheel 104. The drive pulley 192 drives the pump pulley 190 by means of a drive belt 194.

As illustrated in FIG. 2, the vapor separator 178, low pressure fuel pump 174 and fuel filter 172 are all positioned in the valley of the engine 22. As illustrated in FIG. 3, the vapor separator 178 is positioned above the low pressure fuel pump 174 and the fuel filter 172, which are themselves generally positioned side-by-side. These components may be mounted elsewhere, but this arrangement provides for a preferred compact arrangement.

As best illustrated in FIG. 2, the vapor separator 178 is preferably mounted to and supported by the engine 22 through a support bracket 184. This bracket 184 preferably has a mounting plate portion to which the separator 178 is connected, and a pair of legs 186 extending from the plate to the cylinder heads 53, 54 for spacing the plate portion from the engine 22 in supported fashion.

A vapor discharge is provided for routing vapor from the vapor separator 178. A hose 200 extends from vapor tube 198 to a control valve 202. A first line 204 extends from the valve 202 through the cowling 30 to a point external to the motor 20. A second line 206 leads from the valve 202 to the intake system 72. Preferably, a canister 208 is positioned along the hose 200 between the separator 178 and the valve 202. The canister 208 is adapted to catch or contain liquid fuel.

The second line 206 preferably extends to either a first discharge outlet 210 at the merge of the branch pipes 75, a second outlet 212 along the main pipe 74, or a third outlet 214 at the silencer. In all positions, the vapor is delivered into the intake air passing therethrough and delivered into the engine 22. These particular outlet positions are advantageous since the vapor is distributed into air which is then generally equally distributed to all of the cylinders or combustion chambers of the engine 22. In this manner, not just the air/fuel ratio to a single cylinder or combustion chamber is affected, and the effect of the vapor upon the air/fuel ratio of individual cylinders is reduced.

The valve 202 preferably is controlled in a manner whereby when the engine 22 is running at a low speed or load, the vapor is routed through the first line 204 to a point external to the motor. On the other hand, when the engine is running at a higher speed and the fuel requirements are greater, the valve 202 preferably routes the vapor through the second line 206 to the intake system.

The canister 208 is preferably adapted to store the fuel when the engine speed is low and the vapor is routed through the first line 204, but to distribute the fuel to the intake system when the engine is running at higher speed and the flow through the line 206 is greater.

Figure 5:
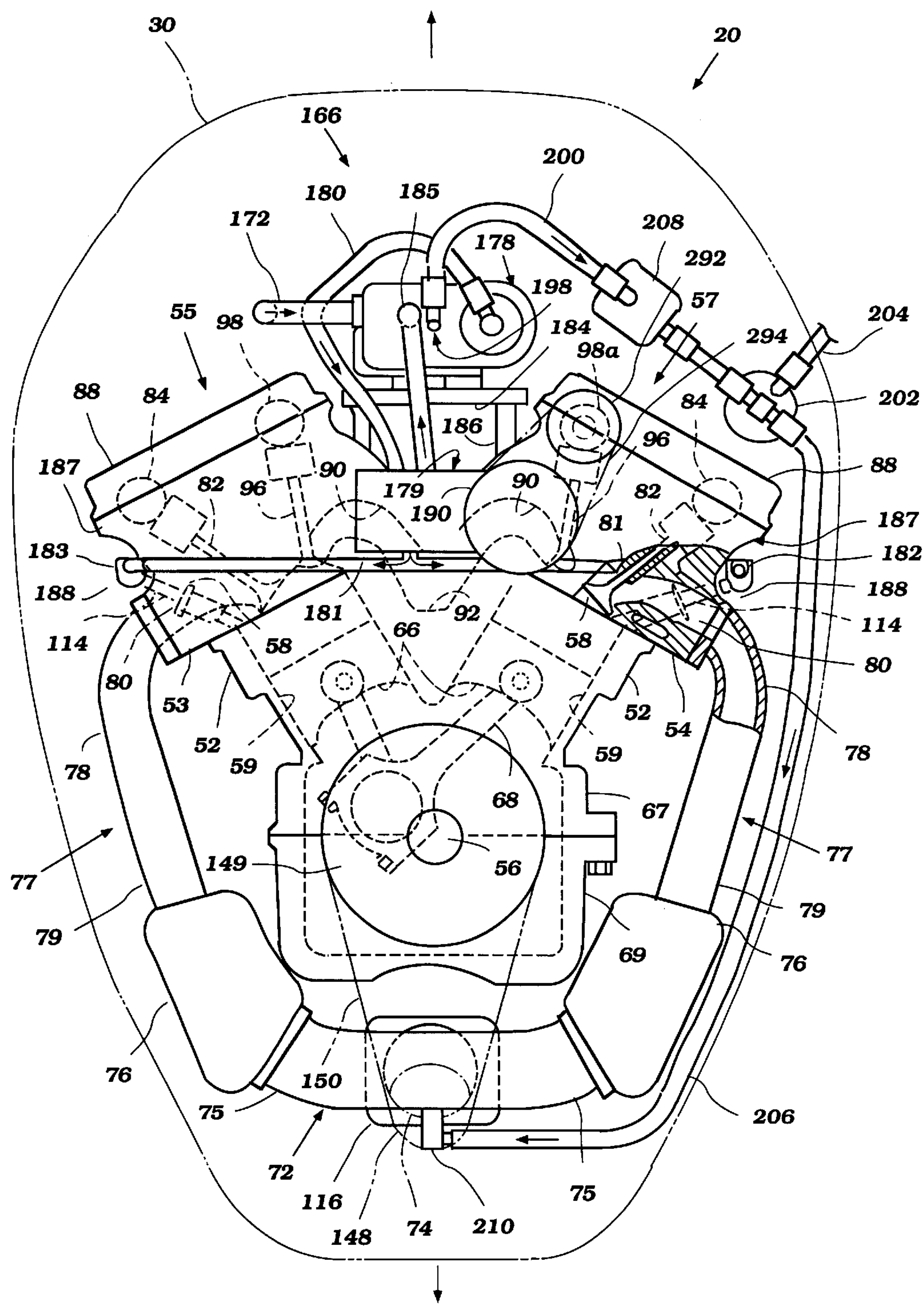
FIG. 5 is a top view of an outboard motor powered by an engine and an associated fuel supply system, which are configured in accordance with another embodiment of the present invention, with a cowling of the motor and several internal components of the engine illustrated in phantom.

A fuel supply system in accordance with a second embodiment of the present invention is illustrated in FIG. 5. This embodiment shares much of the same arrangement as that discussed with reference to FIGS. 1–3 above. Accordingly, similar numbers are used to refer to similar components.

As illustrated in FIG. 5, a drive pulley 292 is positioned at an upper end of the exhaust camshaft 98*a* of the first cylinder bank 54. The high pressure fuel pump 179 has a driveshaft (not shown) which communicates with a pump pulley 290 at the top of the fuel pump 179. A drive belt 294 communicates between the drive pulley 292 and the fuel pump pulley 290 so that the camshaft 98*a* drives the high pressure fuel pump 179 through the drive belt 294.

Figure 6:
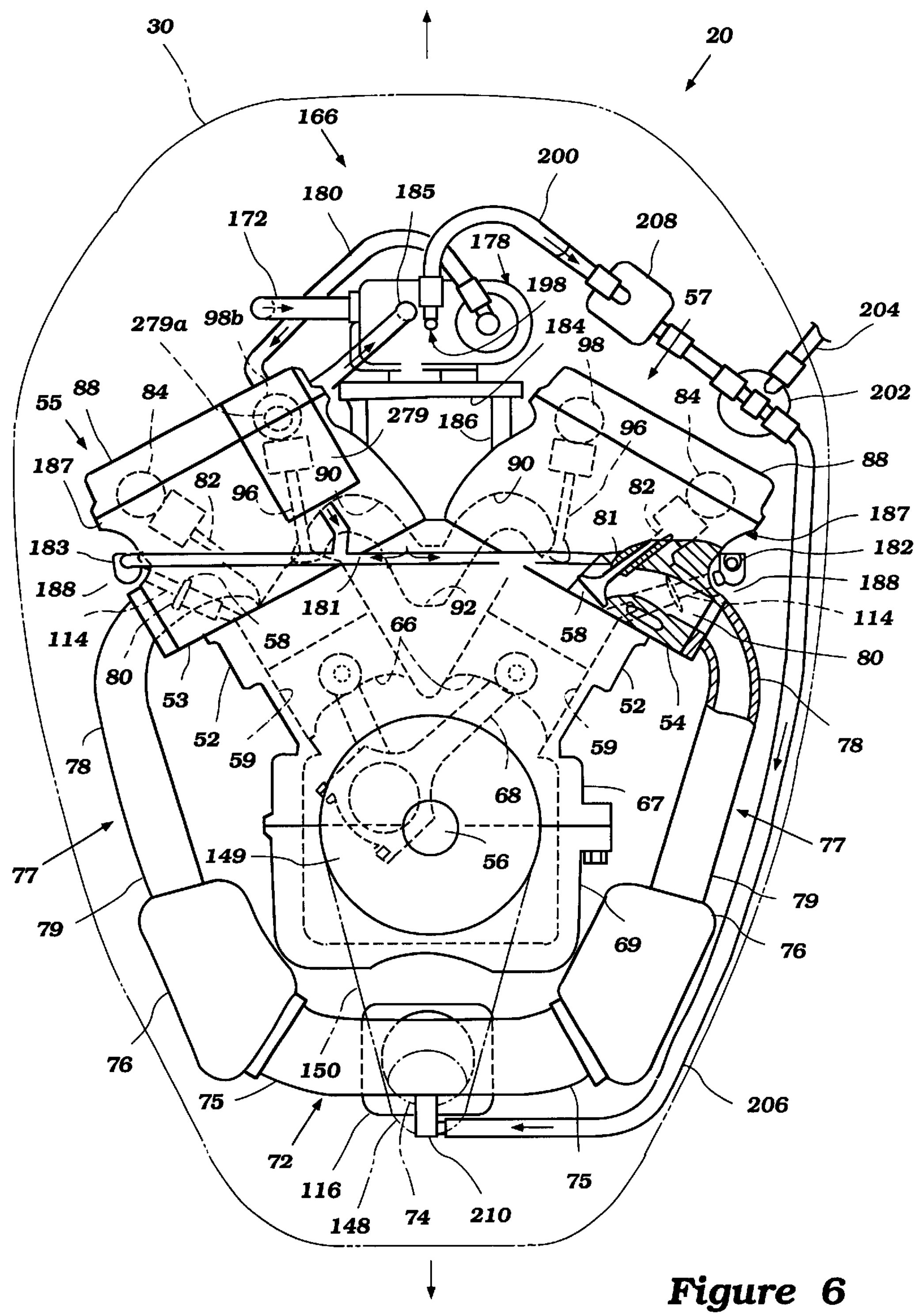
FIG. 6 is a top view of an outboard motor powered by an engine and an associated fuel supply system, which are configured in accordance with an additional embodiment of the present invention, with a cowling of the motor and several internal components of the engine illustrated in phantom.

A fuel supply system in accordance with a third embodiment of the present invention is illustrated in FIG. 6. As with FIG. 5, the present embodiment shares much of the same arrangement as has already been discussed, and similar components are denoted with similar numbers.

As shown in FIG. 6, the high pressure pump 279 is positioned at the top of the engine directly above the upper end of the exhaust camshaft 98*b* of the second cylinder head 53. The high pressure pump 279 is driven by a driveshaft 279*a*. The pump driveshaft 279*a* and the exhaust camshaft 98*b* are coupled so that the driveshaft 279*a* is on the same axis as the camshaft 98*b* and is driven thereby. Thus, the camshaft 98*b* directly drives the high pressure pump 279 without the need for extra parts, such as pulleys and drive belts.

Figure 7:
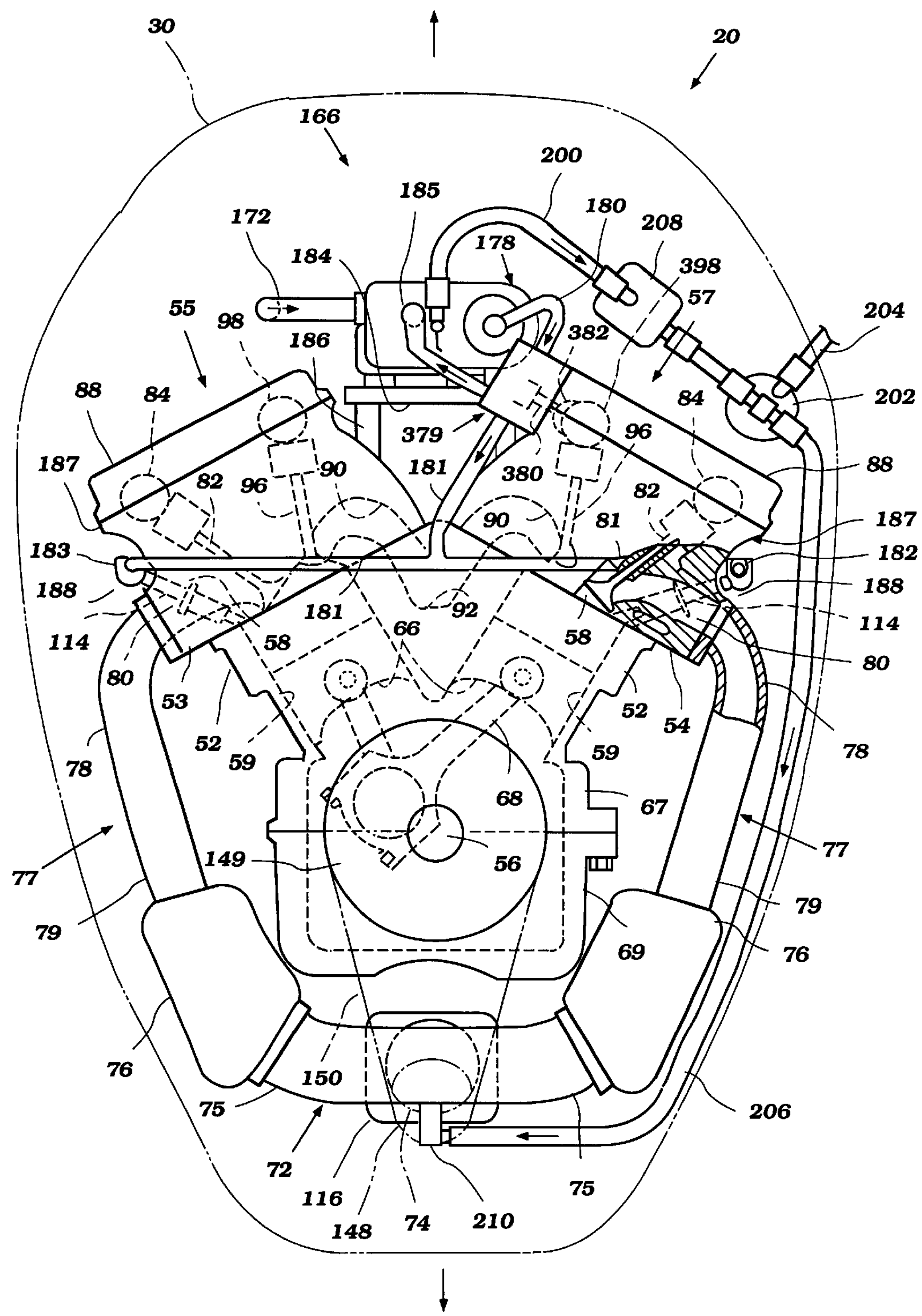
FIG. 7 is a top view of an outboard motor powered by an engine and an associated fuel supply system, which are configured in accordance with another embodiment of the present invention, with a cowling of the motor and several internal components of the engine illustrated in phantom.

A fuel supply system in accordance with a fourth embodiment of the present invention is illustrated in FIG. 7. As with FIGS. 5 and 6, the present embodiment shares many features with the embodiments described above with reference to FIGS. 1–3. These similar features are depicted with similar numbers.

As illustrated in FIG. 7, a high pressure fuel pump 379 is provided located at least partially within the valley and immediately adjacent the first cylinder head 54. As in the previous embodiments, the high pressure pump 379 is located above the fuel delivery manifold 181 so that vapor within the fuel rails 182, 183 will flow upwardly and into the pump 379. The fuel pump 379 preferably includes a plunger 380 adapted to power the pump 379 by reciprocating movement. The exhaust camshaft 398 of the first cylinder bank 54 has a pump drive cam 382 adapted to engage and drive the pump plunger 380 in a reciprocating manner. Thus, the fuel pump 379 is driven directly by the camshaft 398 without the requirement for extra parts, such as pulleys and drive belts. Also, the pump 379 is positioned at least partially within the valley between the cylinder heads 53, 54. This placement reduces the overall girth of the engine.

Of course, the foregoing description is that of preferred embodiments of the invention, and various changes and modifications may be made without departing from the spirit and scope of the invention, as defined by the appended claims.

What is claimed is:

1. An engine for powering an outboard motor, the engine positioned in a cowling of the motor and arranged to drive a water propulsion device of the motor, the engine comprising a plurality of combustion chambers arranged generally vertically above one another, a charge former communicating with each combustion chamber, and a fuel supply system for supplying fuel to the charge formers, the fuel supply system including a pump and a fuel rail, the fuel rail communicating with at least some of the charge formers and the pump having a discharge port that communicates with the fuel rail, the pump discharge port being positioned above an uppermost one of the charge formers.

2. The engine of claim 1, Wherein the charge formers comprise fuel injectors.

3. The engine of claim 2, wherein the fuel injectors are arranged on the engine to deliver fuel directly to the corresponding combustion chamber.

4. The engine of claim 1, wherein the fuel supply system additionally comprises a vapor separator, a second pump, and a third pump, the second pump adapted to deliver fuel to the vapor separator and the third pump delivering fuel from the vapor separator to the first pump.

5. The engine of claim 1 additionally comprising a fuel manifold communicating with the pump and the fuel rail, and the fuel rail has a longitudinal axis that is substantially vertically oriented.

6. The engine of claim 5, wherein the fuel rail has a terminus that prevents fuel from flowing beyond the terminus, and the pump is adapted to maintain a pressure of fuel within the fuel rail.

7. The engine of claim 1, wherein the engine additionally comprises a crankshaft, and the fuel pump is positioned on a top side of the engine and is driven by the crankshaft.

8. The engine of claim 7, wherein the fuel pump is coupled to a fuel pump pulley and the crankshaft is coupled to a crankshaft pulley, and a belt connects crankshaft pulley with the fuel pump pulley so that the crankshaft drives the fuel pump through the belt.

9. The engine of claim 1, wherein the engine additionally comprises a camshaft, and the fuel pump is positioned on a top side of the engine and is driven by the camshaft.

10. The engine of claim 9, wherein the camshaft drives the fuel pump through a belt.

11. The engine of claim 9, wherein the fuel pump has a driveshaft, and the driveshaft is coupled to the camshaft so that the driveshaft rotates with the camshaft.

12. The engine of claim 1, wherein the engine additionally comprises a camshaft having a pump drive cam, and the fuel pump additionally comprises a plunger, and the plunger is driven by the pump drive cam.

13. The engine of claim 1 including a cylinder block, a first cylinder head connected to the cylinder block and cooperating therewith to define a first cylinder bank containing at least one cylinder, the at least one cylinder being adapted to accommodate a reciprocating piston, a second cylinder head connected to cylinder block and cooperating therewith to define a second cylinder bank containing at least one cylinder that is adapted to accommodate a reciprocating piston, said first and second cylinder banks arranged generally in a "V" shape and having a valley defined therebetween at a first side of said engine, each combustion chamber being defined at least in part by one of the cylinders, one of the pistons, and one of the cylinder heads.

14. The engine of claim 13 additionally comprising a camshaft having a pump drive cam, and the fuel pump additionally comprising a plunger, the plunger being driven by the pump drive cam.

15. The engine of claim 14, wherein the fuel pump is at least partially positioned in the valley.

16. The engine of claim 13 additionally comprising a fuel manifold communicating with the pump and with first and second fuel rails, the first and second fuel rails each having a longitudinal axis and being arranged such that the longitudinal axis extends generally vertically, the first fuel rail supplying fuel to the at least one charge former in the first cylinder bank and the second fuel rail supplying fuel to the at least one charge former in the second cylinder bank.

17. The engine of claim 16, wherein each of the cylinder heads has opposing first and second sides, the first side facing the valley and the second side having a recess formed therein, and each fuel rail is positioned within one of the recesses.

18. An engine for powering an outboard motor, the engine positioned in a cowling of the motor and arranged to drive a water propulsion device of the motor, the engine comprising a cylinder block, a first cylinder head connected to the cylinder block and cooperating therewith to define a first cylinder bank containing at least one cylinder, the at least one cylinder being adapted to accommodate a reciprocating piston, a second cylinder head connected to the cylinder block and cooperating therewith to define a second cylinder bank containing at least one cylinder that is adapted to accommodate a reciprocating piston, said first and second cylinder banks arranged generally in a "V" shape and having a valley defined therebetween at a first side of said engine, a plurality of combustion chambers arranged generally vertically above one another, each combustion chamber being defined at least in part by one of the cylinders, one of the pistons, and one of the cylinder heads, a charge former communicating with each combustion chamber, and a fuel supply system for supplying fuel to the charge formers, the fuel supply system including a fuel manifold communicating with a pump and first and second fuel rails, the fuel rails communicating with at least some of the charge formers, each of the fuel rails having a longitudinal axis and being arranged such that the longitudinal axis extends generally vertically, the first fuel rail supplying fuel to the at least one charge former in the first cylinder bank and the second fuel rail supplying fuel to the at least one charge former in the second cylinder bank, and the pump having a discharge port that communicates with the fuel rails, the pump discharge port being positioned above an uppermost one of the charge formers, wherein each of the cylinder heads has opposing first and second sides, the first side facing the valley and the second side having a recess formed therein, and each fuel rail is positioned within one of the recesses.

19. An engine for powering an outboard motor, the engine positioned in a cowling of the motor and arranged to drive a water propulsion device of the motor, the engine comprising an engine body having a plurality of cylinders, each cylinder having a piston mounted to reciprocate therein, a cylinder head assembly, a combustion chamber defined between each cylinder, piston and the cylinder head assembly, the combustion chambers arranged generally vertically above one another, the cylinder head assembly having opposing first and second sides, the first side side having a recess formed therein, a charge former communicating with each combustion chamber, and a fuel supply system for supplying fuel to the charge formers, the fuel supply system including a pump and a fuel rail, the fuel rail communicating with at least one of the charge formers and the pump having a discharge port that communicates with the fuel rail, the pump discharge port being positioned above an uppermost one of the charge formers, at least a portion of the fuel rail being positioned within the cylinder head assembly recess.

20. The engine of claim 19, wherein the fuel rail has a generally vertical longitudinal axis.

21. The engine of claim 19, wherein an intake port and an exhaust port open into each of the combustion chambers, the intake and exhaust ports each having valves adapted to open and close the respective port, and at least one valve-actuating camshaft is driven by an engine crankshaft and comprises a cam lobe configured to actuate one of the valves, wherein the valve-actuating camshaft drives the fuel pump.

22. The engine of claim 21, wherein the valve-actuating camshaft additionally comprises a cam lobe configured to actuate the fuel pump.

23. The engine of claim 21, wherein the fuel pump has a driveshaft, and the driveshaft is coupled to an upper end of the valve-actuating camshaft so that the driveshaft rotates with the camshaft.

* * * * *

UNITED STATES PATENT AND TRADEMARK OFFICE

CERTIFICATE OF CORRECTION

PATENT NO. : 6,321,711 B1
DATED : November 27, 2001
INVENTOR(S) : Masahiko Kato

It is certified that error appears in the above-identified patent and that said Letters Patent is hereby corrected as shown below:

Title page,
Item [62], Related U.S. Application Data:
"continuation-in-part of application No. 09/131,172, filed on Aug. 7, 1998, now Pat. No. 6,112,505" should read -- Continuation-in-part of application No. 09/131,712, filed on Aug. 10, 1998 --.

The following line should be added after Foreign Application Priority Data:
-- Aug. 11, 1997 (JP)...............................9-216839

Signed and Sealed this

Second Day of July, 2002

*Attest:*

JAMES E. ROGAN

*Attesting Officer* *Director of the United States Patent and Trademark Office*